Figure 2:
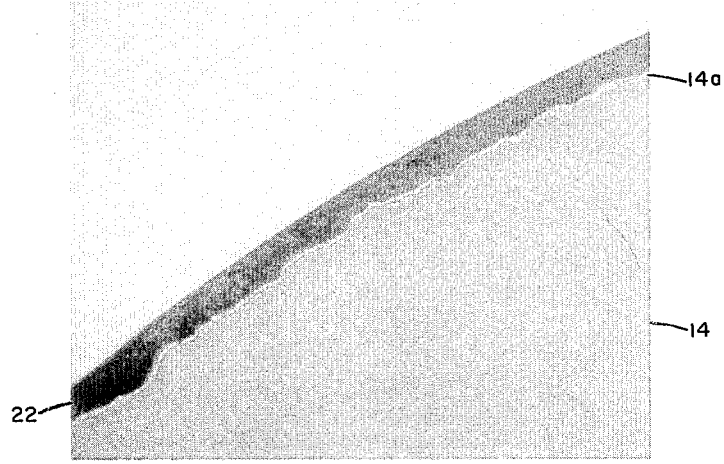

May 24, 1966 P. P. ZAPPONI 3,252,743

BEARING ASSEMBLY

Filed Nov. 18, 1963

INVENTOR
PASCHAL P. ZAPPONI
By
ATTORNEY

United States Patent Office 3,252,743
Patented May 24, 1966

3,252,743
BEARING ASSEMBLY
Paschal P. Zapponi, Cleveland, Ohio, assignor to
Clevite Corporation, a corporation of Ohio
Filed Nov. 18, 1963, Ser. No. 324,443
7 Claims. (Cl. 308—121)

This invention relates to bearing assemblies and in particular to grease packed bearing assemblies in which one of the sliding members is coated with an organic material.

Bearing assemblies of the type using a rigid steel tube concentrically mounted with respect to a rubber bushing are employed in automotive suspension systems. Such bearing assemblies are ordinarily exposed to weather conditions and salt solutions and, therefore, those portions of the steel member constituting the grease retaining seals must be protected against corrosion as the water and salt has a tendency to penetrate into the assembly.

In the prior art this has been accomplished through the use of a nickel or chrome layer which is electroplated upon the rigid steel backing member. While such protective coating has excellent anti-corrosion properties it is wanting in other respects. To begin with, the process is relatively expensive. But of even greater importance is the fact that the resulting coated surface still exhibits considerable roughness. The electroplating process causes the metal to be deposited upon the steel member in a fairly uniform manner. Instead of filling the peaks and valleys or voids and irregularities in the microscopic surface of the steel member, the layer follows the surface pattern and takes on a shape which is not very much unlike the surface it covers. In other words, in electroplating a fairly stable mass is deposited which does not have the tendency to flow and fill the voids.

Furthermore, with nickel or chrome plating there nevertheless remains the problem of squeaking and friction. It is well known that nickel or chrome does not exhibit very good frictional properties. Friction lessens the sliding capability or slippage of the rubber member relative to the steel backing member. Indeed, under certain conditions it tends to aggravate a sticking problem frequency found in rubber to steel sliding members, which causes in one form squeaking and in others sticking with consequent wear and tear upon the rubber part and ultimate leakage of the lubricant.

Other efforts have centered on the use of a polymer of tetrafluoroethylene, a material more commonly known as "Teflon" (a registered trademark).

In the automotive bearing or bushing field, with its attendant stringent requirements, the use of Teflon has been difficult and expensive. Thus it has been proposed to apply a solid sheet of Teflon film to the surface of the backing member or bearing member. However, it has been found that one side of the film must be specially treated to facilitate a proper bond with the steel member. The process of applying the film and treating the Teflon are too expensive for a low price mass-production article.

The use of Teflon particles suspended in a solution and applied to a bearing member does in part solve the bonding problem. However, as such a structure is by its very nature porous, it has been found, that its abrasive qualities are completely inadequate.

It is therefore the primary object of this invention to provide a bearing member avoiding the shortcomings of the prior art and exhibiting low friction and high corrosion resistance.

It is a further object of this invention to provide a bearing member having improved high to low temperature stability, low cost of manufacture and exhibiting good wear and abrasion resistance.

It is a further object of this invention to provide a bearing member which is coated from a liquid phase and provides a solid, continuous, film to attain the advantages over the prior art enumerated above.

It is a further object of this invention to simplify and to substantially cut the cost for coating a bearing member, by enabling the use of a fluid spray or dipping method.

For a better understanding of the present invention, together with other and further objects thereof, reference is had to the following description taken in connection with the accompanying drawings, and its scope will be pointed out in the appended claims.

Figure 1:
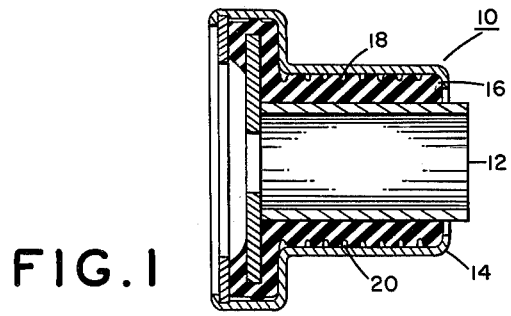

In the drawing:

FIGURE 1 is a longitudinal cross-sectional view of a typical bearing assembly embodying the instant invention; and FIGURE 2 is a photomicrograph showing, at a magnification of two hundred fifty times, a metallic bearing sleeve in cross section and more particularly a flanged part thereof.

An aspect of the present invention resides in the provision of a bearing assembly which includes a first bearing surface which is formed of a rigid material and constitutes a backing member or support member. The surface has voids and irregularities of a microscopic magnitude which is normal to such a member immediately after this member is form shaped. A layer of a physically stable and non-porous coating material is bonded to the first bearing surface and fills the voids and irregularities. The outer face of the layer has a microscopic surface of a substantially greater uniformity than the correlative surface of the first bearing surface without the layer. A second bearing surface is formed of resilient material and disposed in sliding contact with the coated first bearing surface. Either one of the two bearing members forms a retaining wall to confine a lubricant between the two bearing surfaces. This lubricant, which is viscous, is located of course between those two surfaces to improve frictional properties.

The invention is typically embodied in a bearing assembly 10 of the type shown in FIGURE 1. However, illustrating the invention as being embodied in this specific bearing assembly is merely for ease of description and is in no way to be interpreted in a restrictive sense.

Briefly, the bearing assembly 10 is comprised of a tubular inner sleeve member 12 and a concentrically arranged outer sleeve bearing member 14, both of which are composed of a rigid material suitable as a backing member, such as steel. A rubber sleeve bearing member 16 is mounted between the concentric metal sleeves 12 and 14, and is secured to only one of the sleeves to prevent relative rotary motion between the rubber sleeve and the one metal sleeve to which it is secured. In the device shown, one face of the rubber sleeve 16 is bonded or otherwise affixed to the inner metal sleeve 12. The other face of the rubber sleeve is provided with a plurality of rib portions 18 which are in direct, lubricated, load bearing engagement with the bearing face 14a of the metal sleeve 14.

A lubricant 20, not visible as such, is positioned between the ribs 18 to provide for a permanently lubricated area of contact between the rubber sleeve 16 and the outer metal sleeve 14. The axial ends of the bearing are suitably sealed to prevent the escape of the permanent lubricant and to prevent dirt from infiltrating into the lubricated area. For a detailed discussion and description of a bearing as above briefly described see copending application Serial No. 103,690, now U.S. Patent No. 3,133,769, assigned to the same assignee as the instant invention.

The improvement of the sliding contact between the bearing surfaces of rubber sleeve 16 and metal sleeve is illustrated in FIGURE 2. The internal bearing surface 14a of the metal sleeve is coated to fill the voids and irregularities which are, basically, of a microscopic nature.

A layer 22 of a physically stable and non-porous coating material is bonded to the bearing surface 14a which faces the rubber sleeve 16. The layer or film 22 is deposited upon the bearing surface in a manner to fill the aforesaid voids and irregularities, so that the resulting surface, or outer face of the sleeve 14 facing the rubber sleeve 16, has a microscopic surface which exhibits a substantially greater uniformity and smoothness than the bearing surface of the sleeve without the coating. FIGURE 2 aptly illustrates this point.

It has been found that a phenolic base substance is a suitable coating material. A preferred example of such substance is phenol-formaldehyde. The coating material is, preferably, composed of at least 50 weight percent phenol-formaldehyde. The balance is selected from a group of additives which includes molybdenum-disulfide, graphite and tetrafluoro-telomer. These additives are used to a degree depending upon the characteristics desired. It should be noted, however, that the coating without such additives has also been found very satisfactory. For most applications the percentage of additives in the compound is in the range as follows:

| | Weight percent |
|---|---|
| Molydisulfide | 0 to 40 |
| Graphite | 0 to 30 |
| Tetrafluoro-telomer | 0 to 40 |

This phenolic base coating provides a strong bond with the sleeve, is wear and tear resistant, physically stable, exhibits low frictional properties to rubber and has a certain degree of flexibility which helps to avoid sticking.

The coating 22 is of such a nature that it can be sprayed from a liquid phase upon the sleeve 14, the sleeve can be dipped into a container with the phenolic substance, brushed onto the sleeve, etc. These are well known and most inexpensive processes. Prior to the application of the coating upon the sleeve 14, the bearing surface is vapor degreased, sand blasted and then again vapor degreased. For the composition noted above, it has been found satisfactory to air dry and cure the coating on the sleeve at 400° F. for one-half hour.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A wet lubricated bearing assembly comprising, in combination: a first bearing surface formed of a rigid material constituting a bearing member and having microscopic voids and irregularities normal to such a member; a layer of a physically stable and non-porous coating material composed, predominantly, of a phenolic base substance and being bonded to said first bearing surface for filling said voids and irregularities, the outer face of the layer having a microscopic surface of a substantially greater uniformity than the correlative surface of the first bearing surface without the layer; a second bearing member having a bearing surface formed of resilient material and disposed in sliding contact with the first bearing surface; means formed as part of one of said bearing surfaces to confine a wet lubricant between said surfaces.

2. A bearing assembly according to claim 1, wherein said phenolic substance is phenol-formaldehyde.

3. A bearing assembly comprising, in combination: a first bearing surface formed of a rigid material constituting a bearing member and having microscopic voids and irregularities normal to such a member; a layer of a physically stable coating material, composed of at least more than 50 weight percent phenol-formaldehyde and the balance selected from the group of additives consisting of molybdenum disulfide, graphite and tetrafluorotelomer, bonded to said first bearing surface filling said voids and irregularities, the outer face of the layer having a microscopic surface of a substantially greater uniformity than the correlative surface of the first bearing surface without the layer; a second bearing member having a bearing surface formed of resilient material and disposed in sliding contact with the coated first bearing surface; means formed as part of one of said bearing surfaces to confine a lubricant between said surfaces, and viscous lubricant located between said surfaces.

4. A bearing according to claim 3, wherein said additives constitute 0 to 40 weight percent moylbdenum disulfide, 0 to 30 weight percent graphite and 0 to 40 weight percent tetrafluorotelomer.

5. A bearing according to claim 1, wherein said second bearing layer is provided with a plurality of contact ribs for load bearing engagement with the layer of coating material and with a wet lubricant being arranged between said ribs.

6. A wet lubricated bearing assembly comprising, in combination: a first bearing surface formed of a rigid material constituting a bearing member and having microscopic voids and irregularities normal to such a member; a physically stable and non-porous layer composed predominantly of a non-resilient plastic coating material responsive to chemical reaction providing thermosetting characteristics, said layer being bonded to said first bearing surface filling said voids and irregularities, the outer face of the layer having a microscopic surface of a substantially greater uniformity than the correlative surface of the first bearing surface without the layer; a second bearing member having a bearing surface formed of resilient material and disposed is sliding contact with the first bearing surface; and means formed as part of one of said bearing surfaces to confine a wet lubricant between said surfaces.

7. A bearing according to claim 6, wherein said second bearing layer is provided with a plurality of contact ribs for load bearing engagement with the layer of coating material and with a wet lubricant being arranged between said ribs.

References Cited by the Examiner

UNITED STATES PATENTS 2,815,253    12/1957    Spriggs.

FOREIGN PATENTS 1,204,637    10/1959    France.

OTHER REFERENCES

"Bonded Coatings Lubricated Metal Parts," published in Product Engineering, Sept. 5, 1960, pages 48 through 53.

"Friction of Polytetrafluoroethylene Dry Bearings," published in Journal of the Society of Lubrication Engineers, pages 255 through 260.

DAVID J. WILLIAMOWSKY, *Primary Examiner.*

FRANK SUSKO, DON A. WAITE, *Examiners.*